(12) United States Patent
Barton et al.

(10) Patent No.: US 11,888,598 B1
(45) Date of Patent: Jan. 30, 2024

(54) CENTRAL ROUTING FUNCTION (CRF) IMPLEMENTATION ON A CALL ROUTE

(71) Applicant: T-Mobile Innovations LLC, Overland Park, KS (US)

(72) Inventors: Jia Barton, Foster City, CA (US); Manuel Berumen, Phoenix, AZ (US); Quang B. Doan, Roseville, CA (US); Arulraj Duraisamy, Mountain House, CA (US); Muhammad Nauhman Bashir Gora, Irvine, CA (US); Gerald R. Jordan, Jr., Kansas City, KS (US); James Michael Karolak, Arvada, CO (US); Gopalakrishna Sagar, Santa Clara, CA (US); Matthew Schultz, Golden, CO (US); Michael Tsai, Cupertino, CA (US); Kun-Cheng Yang, Hayward, CA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/302,599

(22) Filed: Apr. 18, 2023

(51) Int. Cl.
*H04L 45/02* (2022.01)
*H04L 45/42* (2022.01)

(52) U.S. Cl.
CPC .............. *H04L 45/42* (2013.01); *H04L 45/02* (2013.01)

(58) Field of Classification Search
CPC ................................ H04L 45/42; H04L 45/02
USPC ......................................................... 709/224
See application file for complete search history.

(56) References Cited

U.S. PATENT DOCUMENTS

| | | | |
|---|---|---|---|
| 7,412,051 B1 | 8/2008 | Beathard et al. | |
| 7,457,279 B1 | 11/2008 | Scott et al. | |
| 8,199,670 B2 * | 6/2012 | Mishra | H04Q 3/0054 370/254 |
| 8,605,585 B2 * | 12/2013 | Duan | H04M 15/8228 709/224 |
| 8,750,884 B1 * | 6/2014 | Gorman | H04L 65/1069 455/445 |
| 10,225,181 B2 | 3/2019 | Scott et al. | |
| 11,394,642 B1 * | 7/2022 | Barton | H04L 45/42 |
| 11,463,589 B1 | 10/2022 | Barton et al. | |
| 11,627,076 B2 | 4/2023 | Barton et al. | |
| 11,653,284 B1 | 5/2023 | Barton et al. | |
| 2005/0281199 A1 | 12/2005 | Simpson et al. | |

(Continued)

OTHER PUBLICATIONS

Notice of Allowance dated Mar. 23, 2022 , U.S. Appl. No. 17/364,785, filed Jun. 30, 2021.

(Continued)

*Primary Examiner* — Anthony Mejia

(57) ABSTRACT

A central routing function (CRF) comprises back-to-back user agent application that receives a request for a call route list from a network element, wherein the request comprises a destination telephone number, a list generation application that obtains the call route list from the prioritized call route lists stored in the non-transitory memory based on the destination telephone number, wherein the call route list comprises a plurality of addresses, a pseudo domain name service (DNS) application that translates each address in the call route list into an Internet Protocol (IP) address, in which the back-to-back user agent application attempts to terminate a call using the IP address in the call route list, and in which the CRF platform is implemented in a software container.

20 Claims, 7 Drawing Sheets

(56) References Cited

U.S. PATENT DOCUMENTS

| | | | |
|---|---|---|---|
| 2007/0047706 A1 | 3/2007 | Starling | |
| 2007/0283042 A1 | 12/2007 | West et al. | |
| 2008/0198998 A1 | 8/2008 | Aleynikov | |
| 2010/0220852 A1 | 9/2010 | Willman | |
| 2012/0117235 A1* | 5/2012 | Castro Castro | ..... H04L 12/1403 709/224 |
| 2012/0155628 A1 | 6/2012 | Booth et al. | |
| 2017/0034357 A1 | 2/2017 | Salomon et al. | |
| 2021/0233097 A1 | 7/2021 | Doumar et al. | |
| 2023/0006923 A1 | 1/2023 | Barton et al. | |
| 2023/0247516 A1 | 8/2023 | Barton et al. | |

OTHER PUBLICATIONS

Notice of Allowance dated Jun. 1, 2022, U.S. Appl. No. 17/361,179, filed Jun. 28, 2021.
Restriction Requirement dated Oct. 18, 2022, U.S. Appl. No. 17/332,146, filed May 21, 2021.
Notice of Allowance dated Jan. 19, 2023, U.S. Appl. No. 17/332,146, filed May 21, 2021.
Office Action dated Nov. 7, 2022, U.S. Appl. No. 17/840,449, filed Jun. 14, 2021.
Notice of Allowance dated Dec. 22, 2022, U.S. Appl. No. 17/840,449, filed Jun. 14, 2021.
Barton, Jia, et al., "International Call Route Generation," filed Mar. 31, 2023, U.S. Appl. No. 18/194,440.
Restriction Requirement dated Oct. 31, 2023, U.S. Appl. No. 18/194,440, filed Mar. 31, 2023.

* cited by examiner

CENTRAL ROUTING FUNCTION (CRF) IMPLEMENTATION ON A CALL ROUTE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A call to an international number may be connected to its destination by different routes. For example, a first route may place the call over a first international communication service carrier's network or a second route may place the call over a second international communication service carrier's network to the same number. Likewise, a call to a domestic long-distance number may be connected to its destination by different routes. For example, a third route may place the call over trunks in a third set of states to the destination or a fourth route may place the call over trunks in a fourth set of states to the destination. In the same way, a call to a toll-free number may be connected to its destination by different routes.

SUMMARY

In an embodiment, a central routing function (CRF) platform is disclosed. The CRF platform comprises at least one processor, a non-transitory memory communicatively coupled to the at least one processor that stores a plurality of prioritized call route lists, a back-to-back user agent application stored in the non-transitory memory, a list generation application stored in the non-transitory memory, and a pseudo domain name server (DNS) application stored in the non-transitory memory. The back-to-back user agent application, when executed by the processor, receives a request for a call route list from a network element, wherein the request comprises a destination telephone number. The list generation application, when executed by the processor, obtains the call route list from the prioritized call route lists stored in the non-transitory memory based on the destination telephone number, wherein the call route list comprises a plurality of addresses. The pseudo DNS application, when executed by the processor, translates each address in the call route list into an Internet Protocol (IP) address. The back-to-back user agent application, when executed by the processor, attempts to terminate a call using the IP address in the call route list. The CRF platform is implemented in a software container.

In another embodiment, a method of implementing a central routing function (CRF) platform to provide reliable call control on a call route and ensure that a call terminates effectively is disclosed. The method comprises storing, in a non-transitory memory of the CRF platform, a plurality of prioritized call route lists. Each prioritized call route list associates the call route to a destination telephone number in a prioritized order. The method further comprises receiving, by a back-to-back user agent application of the CRF platform, a request for a call route list from a network element, the request comprising a destination telephone number. The method further comprises obtaining, by a list generation application of the CRF platform, the call route list from the prioritized call route lists based on the destination telephone number, attempting, by the back-to-back user agent application, to complete the call using one or more IP addresses in the call route list according to the prioritized order until the call terminates effectively, and recording, by a key performance indicator (KPIs) collector application, one or more KPIs based on each attempt to complete the call using the one or more IP addresses. The CRF platform is implemented in part using a software container.

In yet another embodiment, a method of implementing a central routing function (CRF) platform to provide reliable call control on a call route and ensure that a call terminates effectively is disclosed. The method comprises storing, in a non-transitory memory accessibly by the CRF platform, a plurality of prioritized call route lists. Each prioritized call route list associates the call route to a destination telephone number in a prioritized order. The method further comprises receiving, by a back-to-back user agent application of the CRF platform, a request for a call route list from a network element, the request comprising a destination telephone number. The method further comprises obtaining, by a list generation application of the CRF platform, the call route list from the prioritized call route lists based on the destination telephone number, wherein the call route list comprises a plurality of addresses, translating, by a pseudo domain name server (DNS) application of the CRF platform, each address in the call route list into one or more IP addresses, and attempting, by the back-to-back user agent application, to complete the call using the one or more IP addresses according to the prioritized order until the call terminates effectively.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
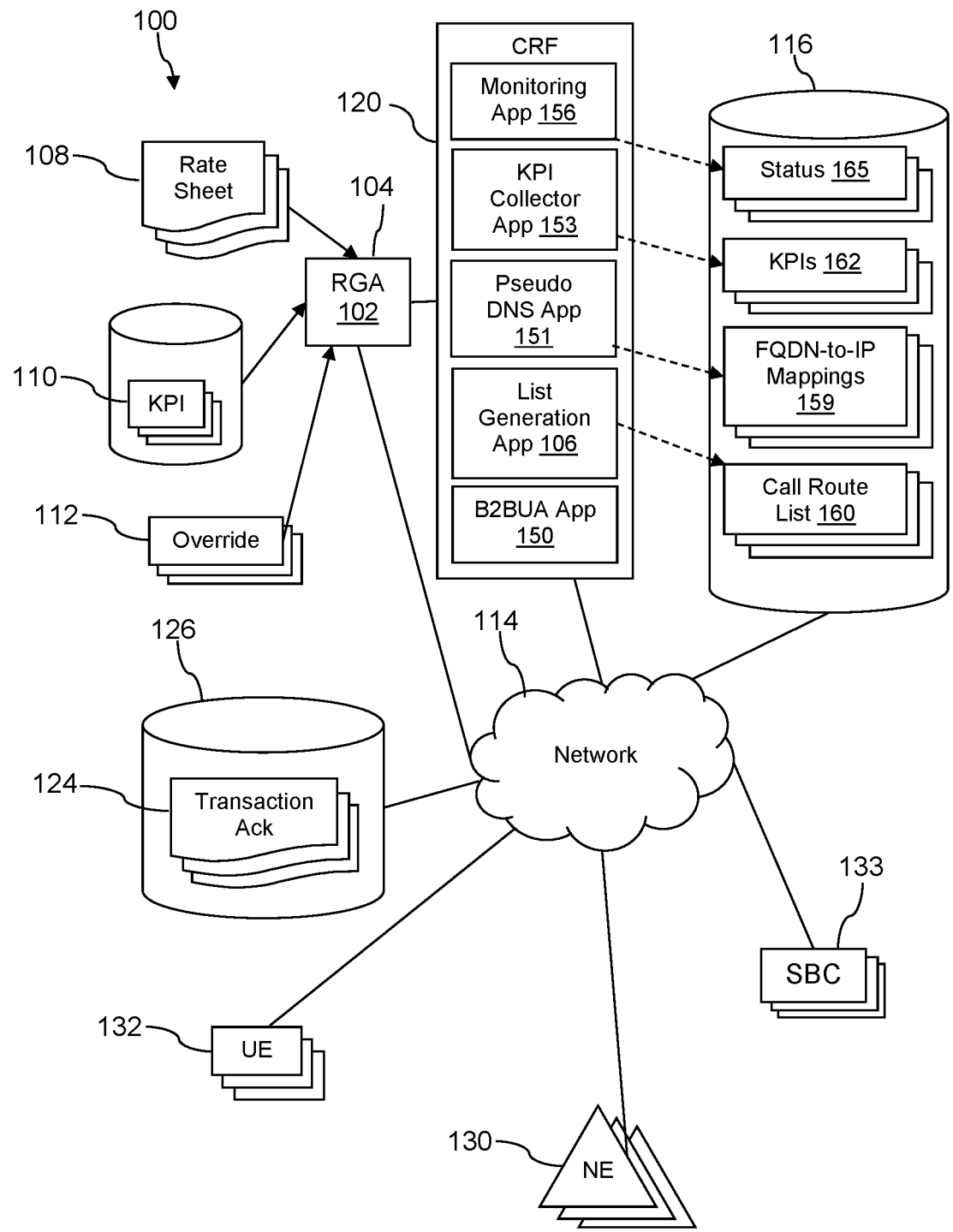
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A call routing function (CRF) has been introduced as a component in a system that generates a prioritized list of routes based on various criteria. A network element (NE) may transmit a query to the CRF for the prioritized list of routes to complete a call from a call originator to a call destination. For example, the originator may be, for example, a user equipment (UE) or computer, and the destination may be a content server, an application server, a UE, or a computer. In some cases, the destination may be a communication service carrier who will receive the call from the NE and deliver it to an end-point UE or to yet another communication service carrier. The NE may refer to the originator or an element in a core network of a home carrier network to which the originator is subscribed. For example, the NE may be a breakout gateway control function (BGCF) in the core network. The call may be a domestic long-distance call, international call, or wholesale call.

The query sent to the CRF may identify various parameters, such as an identification of the originator and a destination telephone number. In response to the request, the CRF may provide an appropriate prioritized call route list based on the parameters in the request. For example, when the NE sending the query is the BGCF in the core network, the BGCF may send the query as a session initiation protocol (SIP) invite including the destination telephone number to the CRF, such that the CRF obtains the prioritized list of routes based on the destination telephone number.

The CRF generates the prioritized list of routes in various different manners, some of which are described in more detail in U.S. patent application Ser. No. 17/332,146, filed May 27, 2021, by Jia Barton et al., entitled "International Call Route Generation Based on Analyzing Minutes of Use Key Performance Indicators (KPIS) Associated with an International Communication Service Carrier" (hereafter referred to as the '146 Application), U.S. patent application Ser. No. 17/364,785, filed Jun. 30, 2021, by Jia Barton et al., entitled "Call Route Generation for Other Communication Service Carriers as a Service" (hereinafter referred to as the '785 Application), and/or U.S. patent application Ser. No. 17/361,179, filed Jun. 28, 2021, by Jia Barton et al., entitled "Domestic Long-distance Call Route Generation" (hereinafter referred to as the '179 Application), all of which are incorporated by reference herein in their entireties. For example, a route generation application on a computer generates route transactions, which may be prioritized according to various criteria. For example, the criterium may include a least cost route and one or more key performance indicators (KPIs) developed from data provided by the NEs and sent by the NEs to a route generation application at a computing device in communication with the CRF. The route generation application may generate prioritized call route list transactions, and a list generation application at the CRF may process these prioritized call route list transactions to build readily searchable prioritized call route lists. Because the CRF has pre-built the prioritized route lists, the CRF can quickly look-up and return the appropriate prioritized call route list to the requesting NE, thereby avoiding delaying the call routing and at the same time making the network more efficient by promoting use of the highest priority call route.

As circumstances change, the route generation application may generate new prioritized route transactions and send them to the CRF. In practice, the route generation application periodically provides an extensive list of new prioritized route transactions as a batch to the CRF. A list generation application at the CRF then processes these prioritized route transactions to generate prioritized call route lists in a readily searchable format. Because the route generation application and the CRF update periodically, for example once per day, once every two days, once per week, the network effectively adapts to use preferred call routes as network conditions change.

The list generation application may be said to restrict each route list to a predefined maximum number of routes. If there are more than the maximum number of routes available for a given call, the list generation application includes only the maximum number of routes selected from the highest priority routes in the route list for that call and the remaining routes are not included in the route list. If there are fewer routes available for a given call, the list generation application may include all of the available routes in the route list in prioritized order.

When an NE needs to route a call, the NE sends a query to the CRF with information about the call. This information may comprise a phone number of the destination device, for example an international telephone number of a terminating device. The CRF uses the phone number to index into the prioritized call routes lists defined by the list generation application and returns a prioritized call route list to the requesting NE.

When the CRF is placed out of the call path (sometimes referred to herein as "call route"), the CRF merely acts as a redirect proxy and otherwise does not take any action in attempting to complete (or terminate) the call, and the CRF is also not in the bearer traffic path. In this case, the CRF obtains the call route list and returns the call route list to the requesting NE, which may be the BGCF or other entity in the core network. After the NE receives the call route list, the NE may be responsible for attempting to complete the call using the highest priority call routes in the call route list. The NE initially attempts to complete the call with the highest priority call route. If the first call route attempted fails, the NE next attempts to complete the call with the second highest priority call route. If the second call route attempted fails, the NE next attempts to complete the call with the third highest priority call route, and so on until the call is completed or the list of alternative routes are exhausted. A call route can be understood to be a communication path or communication link that may pass from an origination device to a termination device via a plurality of intermediate nodes. Different call routes comprise one or more different intermediate nodes. Hereinafter call routes may be referred to as routes to be more concise.

However, in some cases, the NE in the core network may not be equipped with the technology to process the call route list received from the CRF and/or to complete the calls. For example, the BGCF may not be capable of processing the SIP message received from the CRF including the call route list, and the BGCF may not be capable of actually attempting to complete the calls using the routes in the call route list. Therefore, the requesting NE may be unable to properly use the call route list provided by the CRF to implement reliable call control and ensure calls terminate effectively.

In addition, when the CRF is not on the call path, the CRF merely acts as a redirect proxy that obtains the call route list and forwards the call route list to the requesting NE. However, CRF otherwise has no knowledge of whether any of the routes in the call route list resulted in successful completion of the call, no knowledge of any other performance metrics regarding the completion or failure of a call route, and no knowledge of the state of any of the destination carrier networks (also referred to as vendors) to which the call may be attempted.

The embodiments disclosed herein present a technical solution to the foregoing technical problem of core network elements being unequipped to implement reliable call control and ensure calls terminate effectively. First, instead of having the CRF placed out of the call path, the embodiments disclosed herein are directed to implementing the CRF in the call path. Implementing the CRF in the call path refers to using the CRF to perform call attempts using the obtained call route list, instead of using the CRF as a redirect proxy and relying on the requesting NE to perform the call attempts. In some embodiments, the CRF may not only include the list generation application described above, but may also additionally include a back-to-back user agent (B2BUA) application, a pseudo domain name server (DNS) application, a KPI collector application, and a monitor application.

The B2BUA application may receive the request from the requesting NE in the core network and parse the request for the destination telephone number and any other information that may be used to obtain the prioritized call route list for the destination telephone number. The B2BUA application may then obtain the prioritized call route list based on the destination telephone number in the request. At this point, instead of forwarding the call route list back to the requesting NE, the CRF may directly take actions to complete the call on behalf of the originator using the call route list.

Each of the routes on the call route list may include a fully qualified domain name (FQDN) representing a route to an external communication service carrier (also referred to herein as an "external carrier"). The external carrier may be in a partnership with the home communication service carrier (also referred to herein as a "home carrier") of the originator requesting the call. The FQDN may also be associated with a service target corresponding to the external carrier network, an international session border controller (ISBC) name in the external carrier network, and a domain. It should be appreciated that the term SBC as used herein may also refer to ISBCs.

The pseudo DNS application in the CRF may be DNS internal to the CRF, which has access to a database storing mappings between FQDNs and corresponding Internet Protocol (IP) addresses (also referred to as "FQDN-to-IP mappings"). A single FQDN may map to one or more IP addresses across one or more different SBCs or ISBCs. The IP addresses in the FQDN-to-IP mappings may then be used to route calls to the destination telephone number through the corresponding external carrier network. The pseudo DNS application may use the FQDN-to-IP mappings to translate each of the FQDNs in the obtained call route list into IP addresses. The pseudo DNS application may then forward the translated call route list with IP addresses to the B2BUA application.

By implementing the pseudo DNS application internal to the CRF, as opposed to a DNS service external to the CRF, the CRF may have better control over call route optimization and call route updates based on the states of NEs across different carrier networks. This is because external DNS services are often restricted when updating data, often requiring approvals and involving a time-consuming process. By implementing a pseudo DNS application internal to the CRF, the CRF bypasses all the restrictions that would have been involved when using an external DNS service.

The B2BUA application initially attempts to complete the call with the highest priority call route. If the first call route attempted fails, the B2BUA application next attempts to complete the call with the second highest priority call route. If the second call route attempted fails, the B2BUA application next attempts to complete the call with the third highest priority call route, and so on. The B2BUA application may continue attempting to route calls through the next highest priority call route until the call is completed, the list of alternative routes are exhausted, or a maximum quantity of attempts has been reached.

In attempting to complete the call using each IP address in the call route list, the B2BUA application either successfully completes the call (i.e., the call is successfully routed to the destination) or fails to complete the call (i.e., the call is not successfully routed to the destination). Since the CRF is on the call path between the requesting NE and the destination, the CRF may collect valuable KPIs for each route on the call route list that would not have otherwise been obtainable if the CRF was not on the call path. In addition, the CRF may collect these KPIs in a far more resource efficient manner, in that the carrier network does not need to obtain or analyze the KPIs for attempted calls and send this data back to the CRF.

The KPI collector application of the CRF may obtain KPIs for each attempted call, in which the KPI indicates a performance metric, price, or special rule applied in the call attempt. In one embodiment, the KPI collector application may receive the KPI from an entity in the external carrier network associated with the IP address to which the call attempt was made, such as, for example, the SBC. In another embodiment, the KPI collector application may receive KPI data regarding the performance, price, or special rules of the call attempt, generate the KPI for the call attempt based on the data, and then store the generated KPI. For example, the KPIs obtained by the KPI collector application may include a post-dial delay, an average number of successful calls, an average duration of the call, an average mean opinion score, and an answer seizure ratio, a network effectiveness ratio, a quality of service (QoS) indicator, and a failure response code. At least some of the foregoing KPIs may be ones that otherwise would not have been obtainable had the CRF not been on the call path.

Another advantage to implementing the CRF on the call path is that the CRF may communicate directly with SBCs at external carrier networks to determine whether the SBCs are online and able to receive traffic. To this end, the monitoring application of the CRF may send a message to each SBC accessible by the CRF (i.e., each SBC that is in a carrier network partnering with the home carrier network in which the CRF is provisioned). The message may be a heartbeat or keep alive message, such as a SIP OPTION message. After sending the message, the monitoring application may wait to receive a response from the SBC. When a response is received from the SBC, or when a notification indirectly indicating a status of the SBC is received from an external carrier network, the monitoring application may update a status of the SBC stored in a data store accessible by the CRF. The status may indicate that the SBC is active and capable of receiving traffic. When a response is not received from the SBC, or when an error/failure message is received from the SBC, the monitoring application may update the status of the SBC stored in the database to indicate that the SBC is inactive and not capable of receiving traffic. Such a situation may arise when the SBC is out of service, on maintenance, in the process of being deployed, or otherwise impacted in a way that hinders the ability of the SBC to receive and process traffic.

When a status of the SBC has been updated in the database, the list generation application may be triggered to update the call routing lists according to the update. For example, a status of an SBC may be updated to indicate the SBC is inactive. In response to the update to the status, the monitoring application may update the generated call route lists to remove the FQDN of the inactive SBC from the call route lists that include the FQDN of the inactive SBC. The inactive SBC may be removed from the call route lists on a temporary basis, as the monitoring application may periodically send another heartbeat message to the inactive SBC to verify whether the SBC is still offline. In this way, the monitoring application may periodically send the heartbeat messages to the SBCs accessible to the CRF and update the status of the SBCs based on the received response. The monitoring application, while described as being separate from the pseudo DNS application, may be included as part of the pseudo DNS application.

In some embodiments, the CRF may be implemented in a containerized environment, or in a software container, as opposed to on a bare metal server. By implementing the CRF on a container, the CRF becomes portable in the sense that the CRF is no longer limited to being deployed in on-premises hardware or in a data center. The CRF may be provisioned in a cloud server to support traffic and perform the embodiments of call route completion disclosed herein. By implementing the CRF in a container and essentially decoupling the CRF from hardware, the CRF becomes easily scalable and portable, in a flexible manner. Doing so also ensures the most efficient use of resources while improving security of call routes.

Turning now to FIG. 1, a communication system 100 is described. As shown in FIG. 1, system 100 comprises a computer system 104, a CRF 120, data stores 116 and 126, one or more user equipment (UE) 132, one or more network elements 130, one or more session border controllers (SBCs) 133), and a network 114.

In an embodiment, the computer system 104 executes a route generation application 102 (shown as "RGA 102" in FIG. 1) that builds call route transactions based on inputs provided by a plurality of carrier rate sheets 108, a plurality of carrier network key performance indicators (KPIs), and optionally one or more overrides 112. Computer systems are described further hereinafter. The computer system 104 is communicatively coupled to a network 114 that promotes the computer system 104 communicating with a variety of other computers and or data stores. While the rate sheets 108, KPIs 110, and overrides 112 are illustrated in FIG. 1 as providing inputs directly to the computer system 104, in an embodiment, the inputs from these entities 108, 110, 112 may be sent to the computer system 104 and to the route generation application 102 via the network 114. The route generation application 102 may transmit the call route transactions via the network 114 to be stored in a data store 116 accessible by the CRF 120.

In an embodiment, the call route transactions designate international call routes. In an embodiment, the call route transactions designate domestic call routes. In an embodiment, the call route transactions designate wholesale call routes. In an embodiment, the call route transactions designate international call routes and domestic call routes. In an embodiment, the call route transactions designate international call routes, domestic call routes, and wholesale call routes. The wholesale call routes may comprise international call routes, domestic long-distance call routes, and toll-free call routes. In an embodiment, the network 114 comprises one or more public networks, one or more private networks, or a combination thereof.

The system 100 further comprises a central routing function (CRF) 120 that is communicatively coupled to the network 114. The CRF 120 executes various applications, including the list generation application 106, the back-to-back user agent (B2BUA) application 150, the pseudo domain name server (DNS) application 151, the KPI collector application 153, and a monitoring application 156, among other applications not described herein. The list generation application 106 retrieves the call route transactions from the data store 116 and builds call route lists 160 that are stored in the data store 116. These call route lists 160 are prioritized lists of alternative call routes, each of which may be used to route a call from a NE 130 to a UE 132 or other call endpoint or call destination.

In an embodiment, the call route lists 160 built by the CRF 120 designate international call routes, domestic call routes, wholesale call routes, and/or various combinations thereof. Each different call route list 160 associates to a dial code that covers one or more different phone numbers, for example a range of numbers. A call route may designate a fully qualified domain name (FQDN) of a NE to which the call route routes to. In some contexts, the CRF 120 may be referred to as a CRF platform. In an embodiment, the CRF 120 may be implemented as a virtual network function (VNF) and executed on a generic computer system. In an embodiment, the functionality of the CRF 120 may be implemented as one or more software containers.

As the list generation application 106 in the CRF 120 builds the call route lists 160, the list generation application 106 also generates transaction acknowledgments 124 and stores these in a transaction acknowledgement data store 126. The NEs 130 may be any network equipment that is in the call path (e.g., carries bearer traffic). In an embodiment, the NEs 130 may comprise a telecommunications switch, gateway, router, a break-out gateway control function (BGCF), or a media gateway control function (MGCF).

An NE 130 that is placing a call may send a request for a list of call routes to the CRF 120, where the request identifies a call destination. A communication path from the NE 130 to a call destination may be called a call route, and there may be multiple feasible call routes between the NE 130 and a call destination. In an embodiment, if the call destination is an international phone number, the call routes may designate one or more international communication service carrier as the call destination, in the sense that the NE 130 may route the call to the international communication service carrier, and the international communication service carrier then gets the call to the destination.

In an embodiment, the destination is a destination switch or telephone. The list generation application 106 provides a call route list 160 to the NE 130 that lists a plurality of call routes in a prioritized order. The priority order may be determined by the route generation application 102 or the list generation application 106, at least in part, based on an analysis of costs of alternative call routes, an analysis by the route generation application 102 of the KPIs 110, and/or an analysis of the overrides 112. In an embodiment, the priority order may desirably be determined by the route generation application 102 or the list generation application 106 based on a multivariate optimization of each of the costs of alternative routes indicated in the rate sheets 108, KPIs 110, and overrides 112.

The rate sheets 108 may be provided by different carriers and identify tolls they apply for routing calls via their network infrastructure or network infrastructure that they pay for. The overrides may specify certain conditions that apply for determining prioritization of specific call routes that vary from the least cost routing criteria and/or from the optimizing of KPIs 110.

The KPIs 110 shown in FIG. 1 may be collected by the communication service carrier that operates the CRF 120 and stored in a data store (distinguished from the KPIs 162 collected by the CRF 120, further described below). The KPIs 110 may be updated periodically to reflect latest conditions in the different network infrastructures, for example hourly, twice daily, daily, weekly, or on some other time interval. The KPIs 110 may comprise a minutes of usage accumulated during a current reporting or evaluation time period. The minutes of usage KPI 110 may record minutes of usage delivered by a communication service carrier based on traffic directed to that carrier by the CRF 120. In an embodiment, the minutes of usage may be determined based on the signaling between the communication service carrier that operates the CRF 120 and the home carrier that requests the prioritized call route list from the CRF 120.

For example, the time between a "200" SIP OK response to a SIP invite sent by the home carrier and a "BYE" SIP message received from or sent to the home carrier may be used to calculate the minutes of usage of a given call, and these minutes of usage accumulated for all calls associated with that home carrier to determine the total minutes of usage per evaluation time period. In an embodiment, an international SBC operated by the communication service carrier that operates the CRF 120 may monitor the SIP messages and provide a minutes of usage KPI data. The KPIs 110 may comprise information about post-dial delay, average route advances (e.g., SIP 503 response), average duration of call, average mean opinion score (average MOS), average killed calls (SIP 603 response), average successful calls (SIP 200 response), quality of service (QoS) reporting information, etc. In an embodiment, the SBC operated by the home carrier network that operates the CRF 120 may monitor the SIP messages and provide the foregoing KPIs 110.

Additional details regarding the generation of the route transactions and call route list 160 in a prioritized order based on the rate sheets 108, KPIs 110, and the overrides 112 are further described in more detail in the '146 Application, the '785 Application, and the '179 Application, as mentioned above.

Once the call route list 160 including the prioritized list of routes is obtained (i.e., generated) by the list generation application 106, the pseudo DNS application 151 may translate the addresses in the call route list 160 to IP addresses. Each of the routes on the call route list 160 may include a fully qualified domain name (FQDN) representing a route to a partner external carrier. The data store 116 may store FQDN-to-IP mappings 159 indicating associations between FQDNs and corresponding IP addresses, which may then be used to route calls to the destination telephone number through the corresponding external carrier network. The pseudo DNS application 151 may use the FQDN-to-IP mappings 159 to translate each of the FQDNs in the obtained call route list 160 into IP addresses. Each IP address may correspond to an SBC in an external carrier network, through which the call may be routed to the destination. The pseudo DNS application 151 may forward the translated call route list 160 with IP addresses to the B2BUA application 150.

Instead of returning the prioritized call route list 160 to the requesting NE 130, the B2BUA application 150 in the CRF 120 itself attempts to complete the call using the highest priority route in the call route list 160 in a round robin fashion. In particular, the B2BUA application 150 attempts to complete the call using the first highest priority route in the call route list 160. If this route fails, the B2BUA application 150 attempts to complete the call using the second highest priority route in the call route list 160. If the second highest priority route fails, the B2BUA application 150 attempts to complete the call using the third highest priority route in the call route list 160, and so on, until an end condition has been met. The end condition may be that the call has been successfully completed or terminated, the call routes in the call route list 160 have been exhausted, or that a maximum quantity of attempts has been reached.

The maximum quantity of attempts may correspond to a maximum quantity of IP addresses to which the B2BUA application 150 is permitted to attempt to route the call. As mentioned above, each IP address may correspond to an SBC at an external carrier network. The B2BUA application 150 may be restricted in that the B2BUA may only be permitted to attempt call routes to the maximum quantity of IP addresses, and thus a maximum quantity of SBCs at different external carrier networks. For example, the B2BUA application may only attempt a call to a maximum of fifteen different IP addresses (i.e., the maximum quantity is fifteen). In some cases, the SBC may correspondingly be restricted in that the SBC receiving the attempted call may only be permitted to forward the call a maximum quantity of times as well.

Since the CRF is on the call path between the requesting NE and the destination, the CRF is capable of collecting KPIs for each route on the call route list 160 that would not have otherwise been obtainable if the CRF was not on the call path. The KPI collector application 153 may obtain KPIs 162 for each attempted call, in which the KPI 162 indicates a performance metric, price, or special rule applied in the call attempt. In one embodiment, the KPI collector application 153 may receive the KPI 162 from an entity in the external carrier network associated with the IP address to which the call attempt was made, such as, for example, the SBC. In another embodiment, the KPI collector application 153 may receive data regarding the performance, price, or special rules of the call attempt, and generate the KPI 162 for the call attempt based on the data.

For example, the KPIs 162 obtained by the KPI collector application 153 may include a post-dial delay, an average number of successful calls, an average duration of the call, an average mean opinion score, and an answer seizure ratio, a network effectiveness ratio, a quality of service (QoS) indicator, and a failure response code. Unlike KPIs 110 that are collected by the communication service carrier that operates the CRF 120, the foregoing KPIs 162 may be collected by the CRF 120 itself, enabling more accurate and up-to-date performance metrics of call attempts and external carrier network attributes. For example, the KPI collector application 153 may collect data regarding the number of times a call attempt succeeded or failed through a communication carrier network. At least some of the foregoing KPIs may be ones that otherwise would not have been obtainable had the CRF not been on the call path.

The monitoring application 156 may operate independent of the call attempts to communicate directly with SBCs 133 at external carrier networks to determine whether the SBCs 133 are online and able to receive traffic. The monitoring application 156 may send a message to each SBC 133 accessible by the CRF 120 (i.e., each SBC 133 that is in a carrier network partnering with the home carrier network in which the CRF 120 is provisioned). The message may be a heartbeat or keep alive message, such as a SIP OPTIONS message. After sending the message, the monitoring application 156 may wait to receive a response from the SBC 133. The monitoring application 156 may update a status 165 of the SBC 133 stored in data store 116 accessible by the CRF 120 based on whether a response was received or not received from the SBC 133. The status 165 may indicate that the SBC 133 is active and capable of receiving traffic. When a response is not received from the SBC 133, or when an error/failure message is received from the SBC 133, the monitoring application 156 may update the status 165 of the SBC 133 stored in the data store 116 to indicate that the SBC 133 is inactive and not capable of receiving traffic.

When a status 165 of the SBC 133 has been updated in the data store, the monitoring application 156 may be triggered to update the call route lists 160 according to the update. The list generation application 106 may alternatively monitor the status 165 of the SBCs 133 indicated in the data store 116 according to a predefined schedule to determine whether any of the statuses 165 have been updated, and then update the call route lists 160 accordingly. The monitoring application 156 may periodically send another heartbeat message to the SBC-unavailable SBC 133 to verify that the SBC 133 is still offline. In this way, the monitoring application 156 may send the heartbeat messages to the SBCs 133 accessible to the CRF 120 accordingly to a predefined schedule to constantly monitor a state of each of the SBCs 133.

Figure 2:
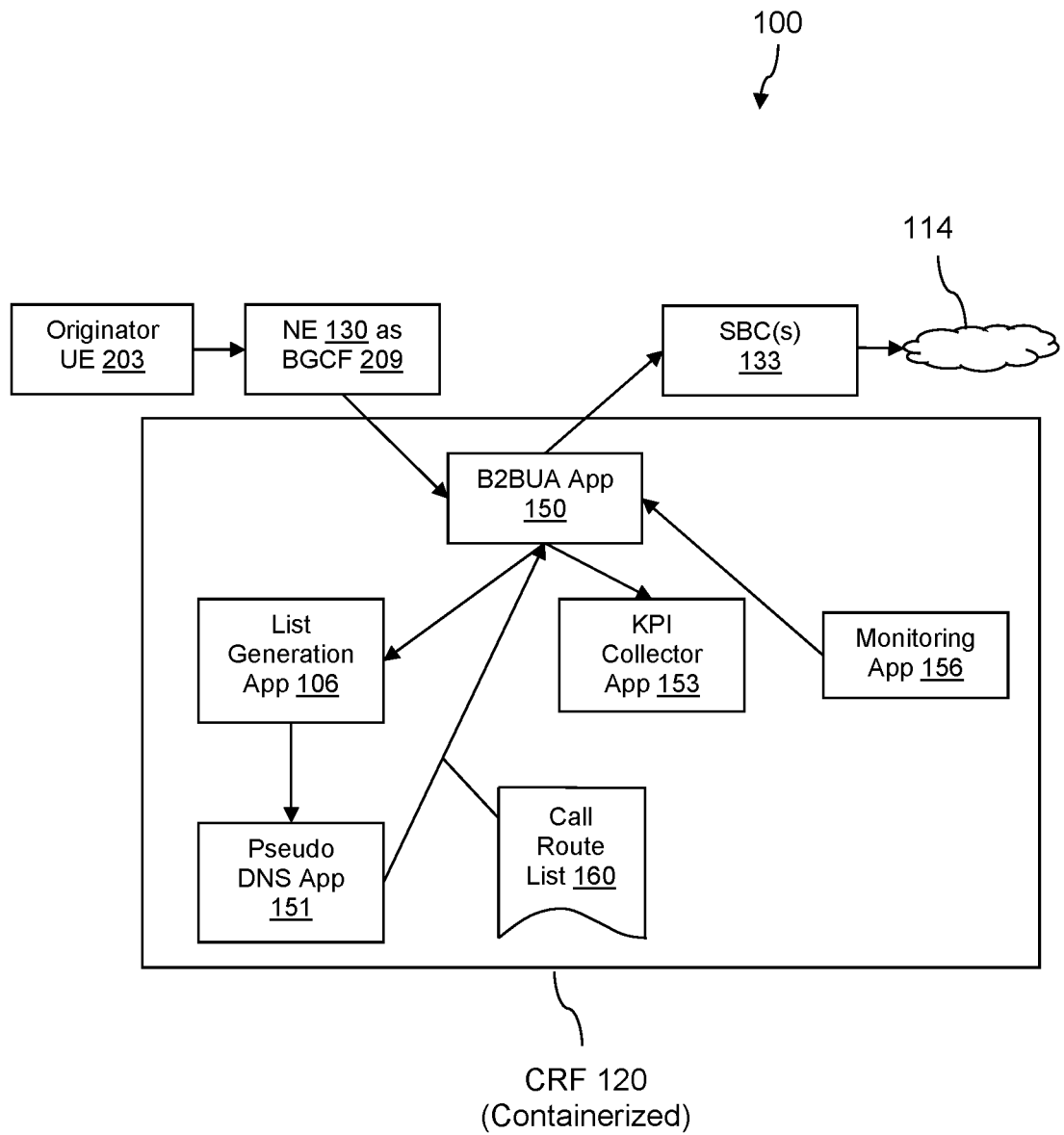
FIG. 2 is another block diagram of a communication system according to an embodiment of the disclosure.

Turning now to FIG. 2, another aspect of the communication system 100 is shown. As shown in FIG. 2, system 100 includes the originator UE 203, an NE 130 implemented as a BGCF 209, the CRF 120, and one or more SBCs 133 connected to various external carrier networks associated with different partnered communication service carriers. The CRF 120 includes the list generation application 106, the pseudo DNS application 151, the KPI collector application 153, and the monitoring application 156.

The originator UE 203 may be the UE initiating a call and seeking a route to a destination UE or network service. The UE 203 may send a message to a NE 130 in a core network of a home carrier network with which the originator UE 203 is subscribed. As shown in FIG. 2, the message may be sent to the BGCF 209 in the core network.

The BGCF 209 may transmit a request, encoded as a SIP invite, to the CRF 120. The request may carry an identification or address of the originator UE 203, the BGCF 209, the home carrier network, or any other information related to the originator UE 203 and the home carrier network. The request may also carry a destination telephone number, identifying the destination to which the originator UE 203 is requesting the call.

The B2BUA application 150 may receive the request and forward a message, such as a Representational State Transfer (REST) message, including at least the destination telephone number to the list generation application 106. The list generation application 106 (sometimes referred to as a routing engine) may obtain the call route list 160 according to the methods described above and the methods defined in the '146 Application, the '785 Application, and the '179 Application mentioned above.

The list generation application 106 may forward the call route list 160 to the pseudo DNS application 151 to translate the FQDNs in the call route list 160 into IP addresses. For example, the call route list 160 may be forwarded to the pseudo DNS application 151 in a REST message. The pseudo DNS application 151 may use the FQDN-to-IP address mappings 159 to translate the FQDNs to IP addresses of the SBCs 133 of different external carrier networks to ultimately route the call to the destination.

The pseudo DNS application 151 may forward the translated call route list 160 with IP addresses back to the B2BUA application 150 to perform call attempts in the prioritized order indicated in the call route list 160. For example, the translated call route list 160 may be forwarded to the B2BUA application 150 in a REST message. To perform the call attempts, the B2BUA application 150 may send messages, such as SIP invites, to each IP address associated with an SBC 133 at one or more external carrier networks. Each SBC 133 in the external carrier networks may continue attempting the route to the destination.

In this way, the pseudo DNS application 151 may allow the CRF 120 to capture and maintain a mapping of FQDNs to ISBC IPs and ports, that may be monitored to ensure responsive to SIP options messages. The pseudo DNS application 151 may include three main components, a graphical user interface (GUI), a backend for storage, and a service. The GUI may be one by which users may access to create, update, or remove FQDN-to-IP mappings 159 based on, for example, the statuses 165 of the IP addresses. The backend storage may be used to manage operations on the FQDN-to-IP mappings 159 or FQDN-to-port mappings. The pseudo DNS application 151 may provide the call route list 160 with the IP addresses such that only a maximum configurable number of IP addresses is provided in the call route list 160.

Each SBC 133 may also collect KPI data based on whether the call attempt was successful and other data regarding the respective external carrier network within which the SBC 133 is positioned. The SBCs 133 of the external carrier networks may send the KPI data back to the B2BUA application 150, for example, a SIP response. The B2BUA application 150 may then forward the KPI data to the KPI collector application 153 in, for example, a REST message. The KPI collector application 153 may obtain (e.g., generate) KPIs 162 based on the KPI data received from the external SBCs 133.

The monitoring application 156 may independently test the state of each of the SBCs 133 to which the CRF 120 has access (i.e., in which the SBCs 133 are positioned in partner carrier networks). The monitor application 156 may send periodic heartbeat or keep alive messages to an IP address corresponding to each of the SBCs 133 in external carrier networks to which the CRF 120 has access. For example, the heartbeat or keep alive messages may be a SIP OPTIONS message. When the SBC 133 responds to the heartbeat message, the status 165 of the SBC 133 may be marked as active in the data store 116. For example, the SIP options message may be sent with a Max-Forward=0, such that if a SIP 483 response was received indicating too many hops, it may be assumed that the SBC 133 is active since the SBC 133 may have received the SIP OPTIONS message. When a response is not received from the SBC 133, the status 165 of the SBC 133 may be marked as inactive to prevent traffic from reaching the inactive SBC 133. The monitoring application 156 may transmit the heartbeat messages according to a predetermined configurable interval, which may be set at default to every 30 seconds.

In this way, the B2BUA application 150 may be responsible for receiving SIP invites from the NE 130, which may be an element in the IMS core, such as, for example, an MGCF, a BGCF, or an ISBC. The B2BUA application 150 may parse the SIP invite to identify the carrier tier, originator, and destination, to send a request to a translations engine to identify preferred routes to the destination based on the tier. The B2BUA application 150 may use the SIP framework to support SIP signaling, which may use a load balancer, a SIP network layer, and a session store. The B2BUA application 150 may include a SIP stack. The B2BUA application 150 may write relevant information into logs to capture alarms, performance KPIs 162, and other performance metrics.

A routing engine of the CRF 120 may be responsible for identifying the querying element in the request, retrieving an element profile, and applying an inbound filter to ensure only trusted elements can send and receive traffic (i.e., whitelisting). The routing engine may also receive a trigger index value from the element profile, and use the trigger index, calling number (i.e., number of originator UE 203) and called number (i.e., destination telephone number) to produce the call route list 160 or a SIP response code. A customizable SIP response code may be provided to the B2BUA application 150 if a route list was not found.

The CRF 120 may also include a batch processing application, which refers to the micro-services, and applications that may support receiving and provisioning updates from multiple sources, either as a batch transaction or as a real time update to allow maintenance of routing information. The CRF 120 may be implemented as a load balanced application in data centers to provide geographical redundancy. Traffic may be load balanced across data centers and across pods within each data center, and each data center may be sized to support the entire load in case of data center failure.

The CRF 120 may receive LCR transactions from ILCRMS generated scripts and provision the transactions into a translations databases component (e.g., into route transactions in the data store 116). Each transaction may be edited by the batch provisioning process for syntax and function, the same edit functions applied by the CRF 120 on the bare metal server may be applied here in the container. The batch provisioning process may also create an acknowledgement file for each batch file that identifies on a line-by-line basis the success or failure of each transaction. The acknowledgement file may be picked up by the ILCRMS to record the success or failure of each transaction.

The CRF 120 may receive batch transactions from user generated scripts and provision those transactions into the Translations databases component. A GUI may support the ability to upload externally generated scripts. A simulation environment may also support processing externally generated scripts before provisioning the transactions into the Translations databases component. The simulation environment may be a duplicate of the Translations databases component and may be updated by the externally generated scripts. The users may be able to re-initialize the simulation environment (mirror production) on a request driven basis. Each transaction may be edited by the batch provisioning and simulation process for syntax and function, and the same edit functions applied by the CRF 120 on the bare metal server may be applied here in the container.

Figure 3:
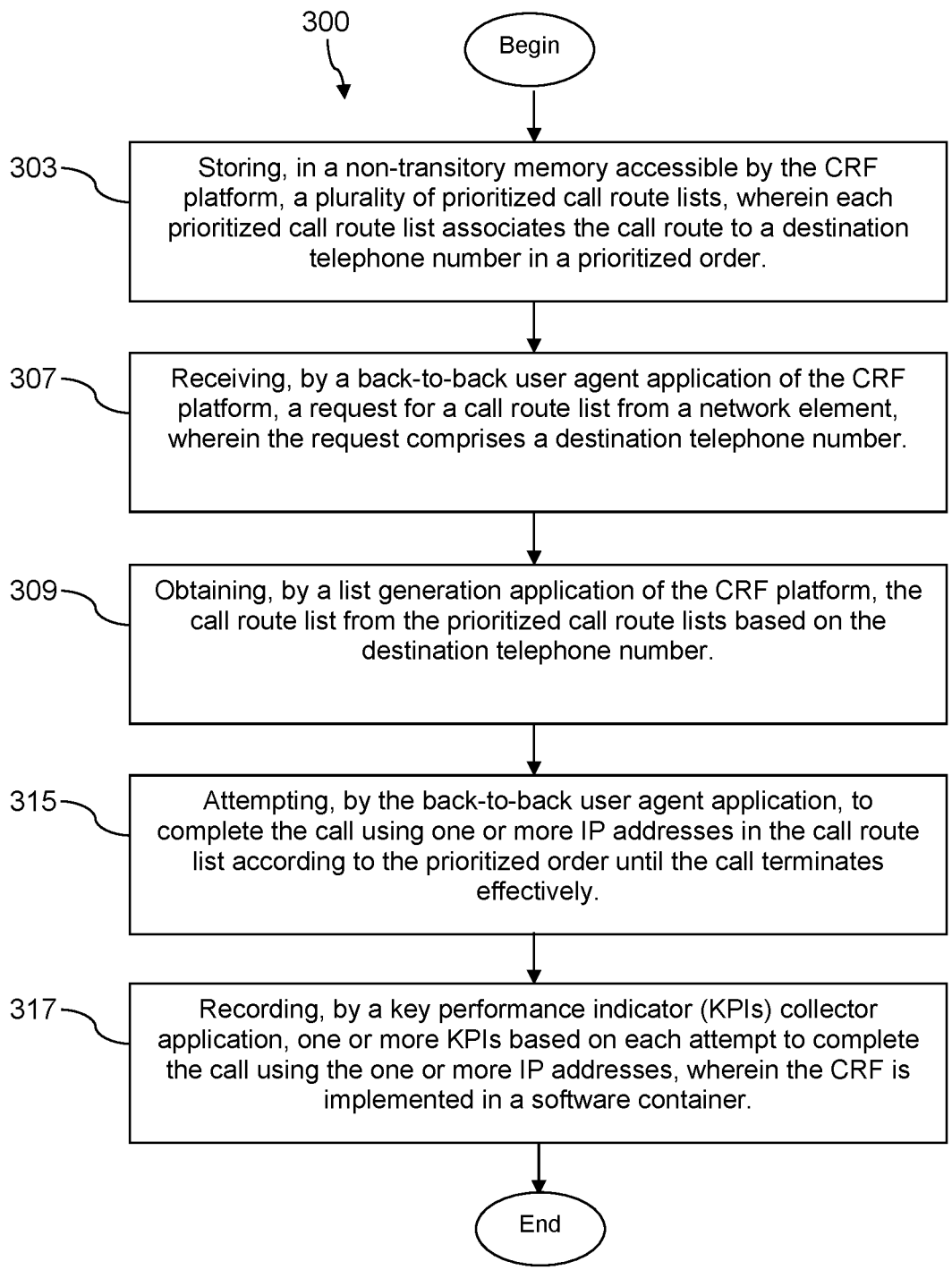
FIGS. 3-4 are flowcharts of methods for implementing of domestic long-distance call routing according to an embodiment of the disclosure.

Referring now to FIG. 3, shown is a flowchart illustrating method 300 according to various embodiments of the disclosure. Method 300 may be performed by the CRF 120 in the system 100. Method 300 may be performed after the route generation application 102 has generated routing transactions, such that the list generation application 106 may generate call routing lists 160 in a prioritized order for one or more destinations.

At step 303, method 300 comprises storing, in a non-transitory memory (i.e., data store 116) accessible by the CRF 120 (also referred to as the CRF platform), prioritized call route lists 160. Each prioritized call route list 160 may associate a call route in a prioritized order to a destination telephone number.

At step 307, method 300 comprises receiving, by a B2BUA application 150, a request for a call route list from a NE 130. The request may comprise the destination telephone number. At step 309, method 300 comprises obtaining, by a list generation application 106, the call route list 160 from the prioritized call route lists 160 stored in the data store 116 based on the destination telephone number.

At step 315, method 300 comprises attempting, by the B2BUA application 150, to complete the call using one or more IP addresses in the call route list 160 according to the prioritized order until the call terminates effectively. At step 317, method 300 comprises recording, by a KPI collector application 153, one or more KPIs 162 based on each attempt to complete the call using the one or more IP addresses. The CRF 120 may be implemented in a container.

Figure 4:
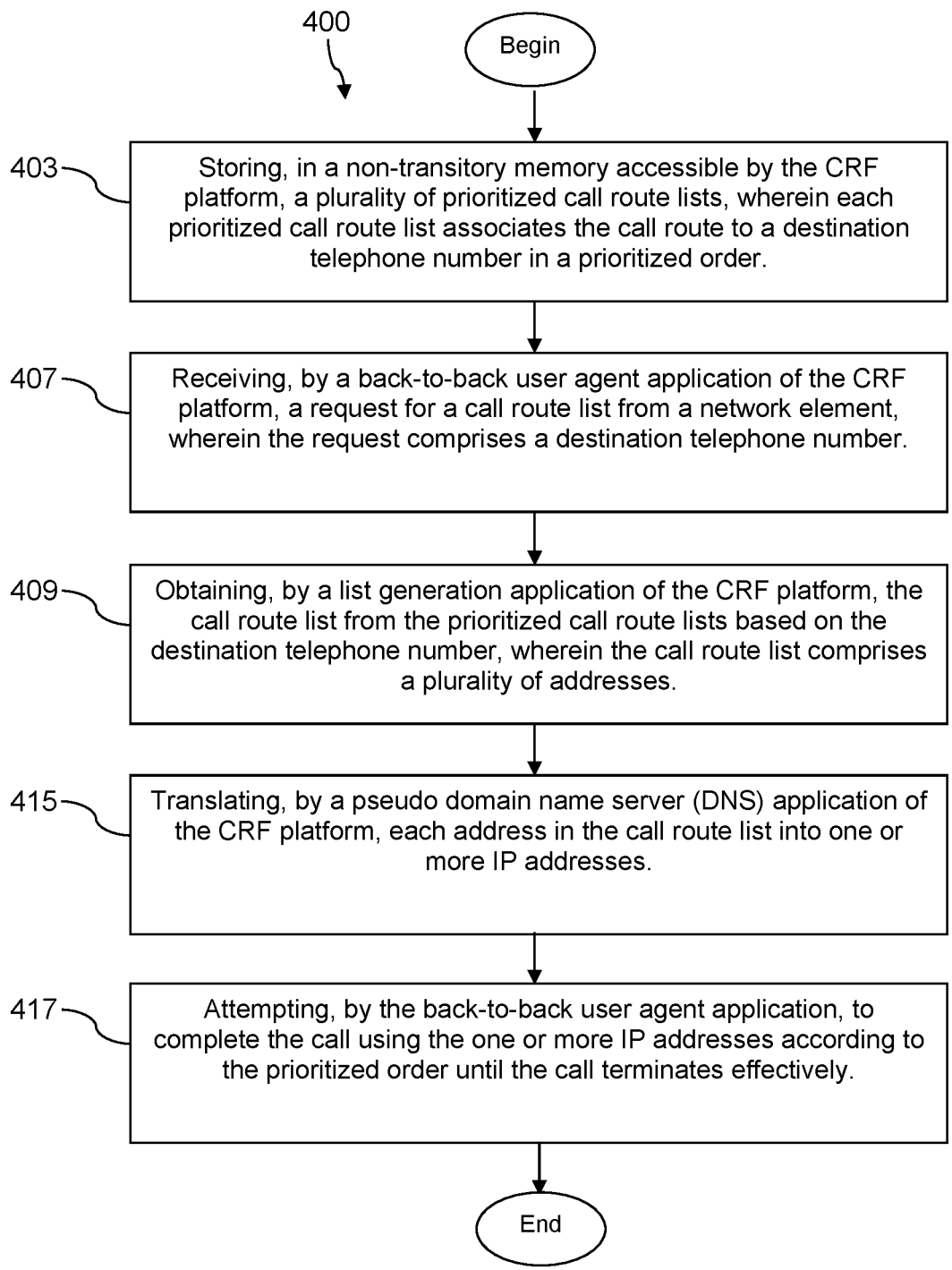

Referring now to FIG. 4, shown is a flowchart illustrating method 300 according to various embodiments of the disclosure. Method 400 may be performed by the CRF 120 in the system 100. Method 400 may be performed after the route generation application 102 has generated routing transactions, such that the list generation application 106 may generate call routing lists 160 in a prioritized order for one or more destinations.

At step 403, method 400 comprises storing, in a non-transitory memory (i.e., data store 116) accessible by the CRF 120 (also referred to as the CRF platform), prioritized call route lists 160. Each prioritized call route list 160 may associate a call route in a prioritized order to a destination telephone number.

At step 407, method 400 comprises receiving, by a B2BUA application 150, a request for a call route list from a NE 130. The request may comprise the destination telephone number. At step 409, method 400 comprises obtaining, by a list generation application 106, the call route list 160 from the prioritized call route lists 160 stored in the data store 116 based on the destination telephone number. The call route list 160 may comprise a plurality of address (i.e., FQDNs).

At step 415, method 400 comprises translating, by the pseudo DNS application 151, each address in the call route list 160 into one or more IP addresses. At step 417, method 400 comprises attempting, by the B2BUA application 150, to complete the call using one or more IP addresses in the call route list 160 according to the prioritized order until the call terminates effectively.

Methods 300 and 400 may include other embodiments and features that are not otherwise shown in FIGS. 3 and 4. For example, methods 300 and 400 may further comprise monitoring, by a monitoring application 156, a status 165 of each international session border controller (ISBC) 133 accessible by the CRF 120 by sending session initiation protocol (SIP) messages to each ISBC 133 according to a predefined schedule, and/or indicating, in the non-transitory memory (e.g., data store 116), the status 165 of each ISBC 133, wherein the status 165 indicates whether the ISBC 133 is active and available to receive traffic. In an embodiment, the call route list comprises a plurality of addresses formatted as FQDNs. Methods 300 and 400 may further comprise translating, by a pseudo DNS application 151, each FQDN in the call route list 160 into the one or more IP addresses. In an embodiment, the one or more IP addresses are each associated with an external carrier network, external to a home carrier network in which the CRF platform is positioned. In an embodiment, the attempting, by the B2BUA application 150, to complete the call using one or more IP addresses in the call route list 160 comprises transmitting, by the B2BUA application 150, a session initiation protocol (SIP) invite to each of the one or more IP addresses. In an embodiment, the B2BUA application 150 is implemented as a SIP stack.

Figure 5A:
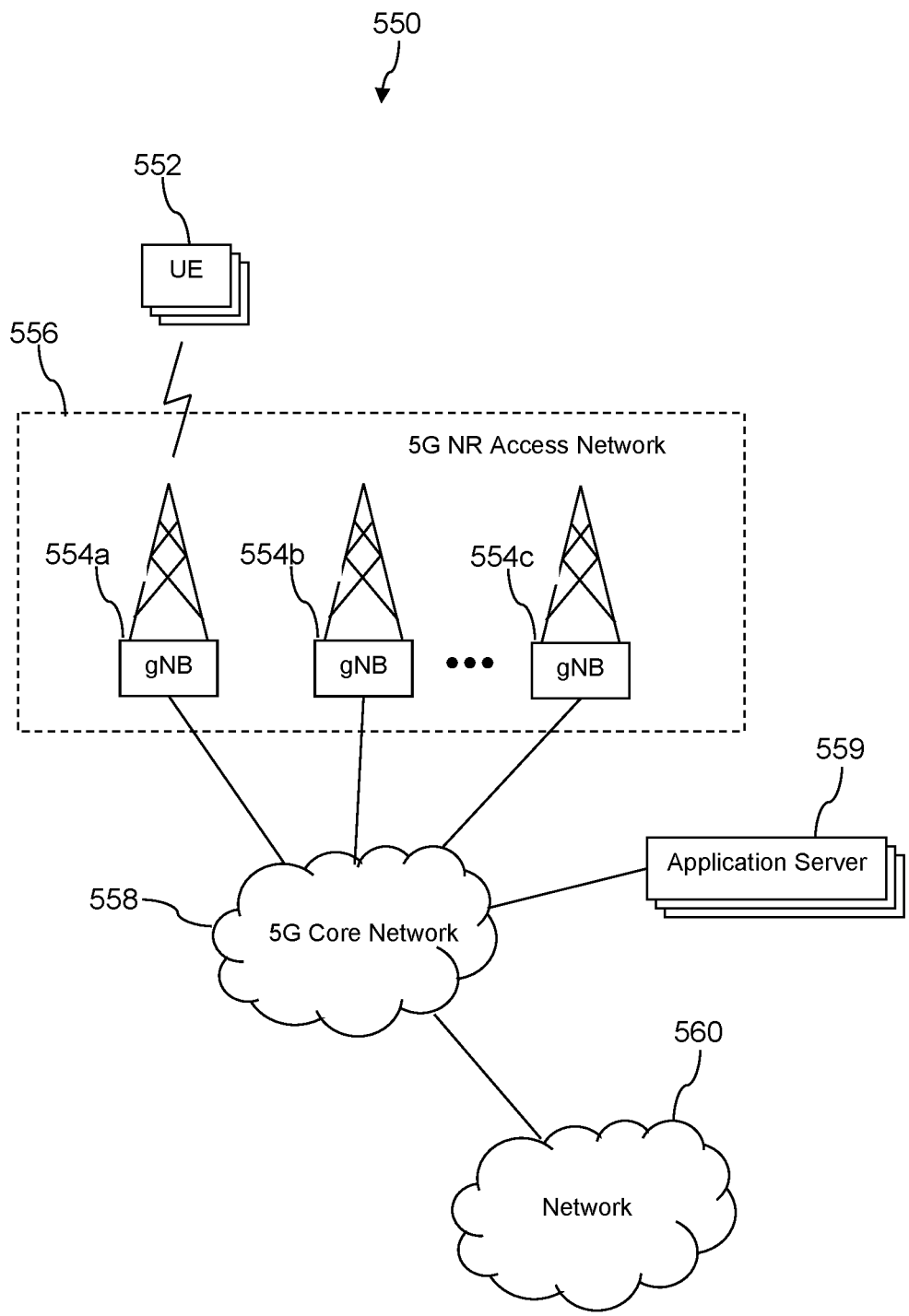
FIG. 5A is a block diagram of a 6G communication network according to an embodiment of the disclosure.

Turning now to FIG. 5A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
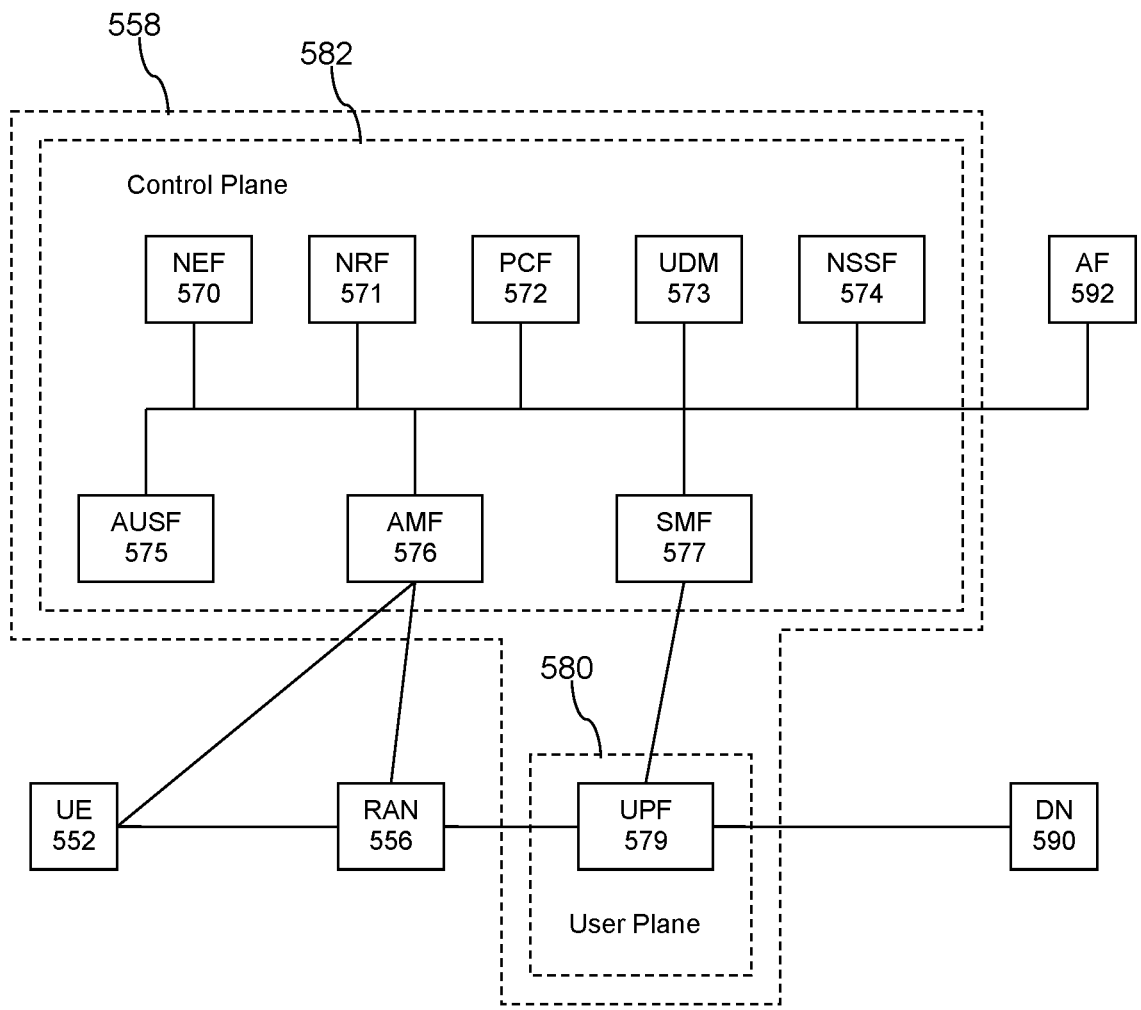
FIG. 5B is a block diagram of a 5G core network according to an embodiment of the disclosure.

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues.

Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
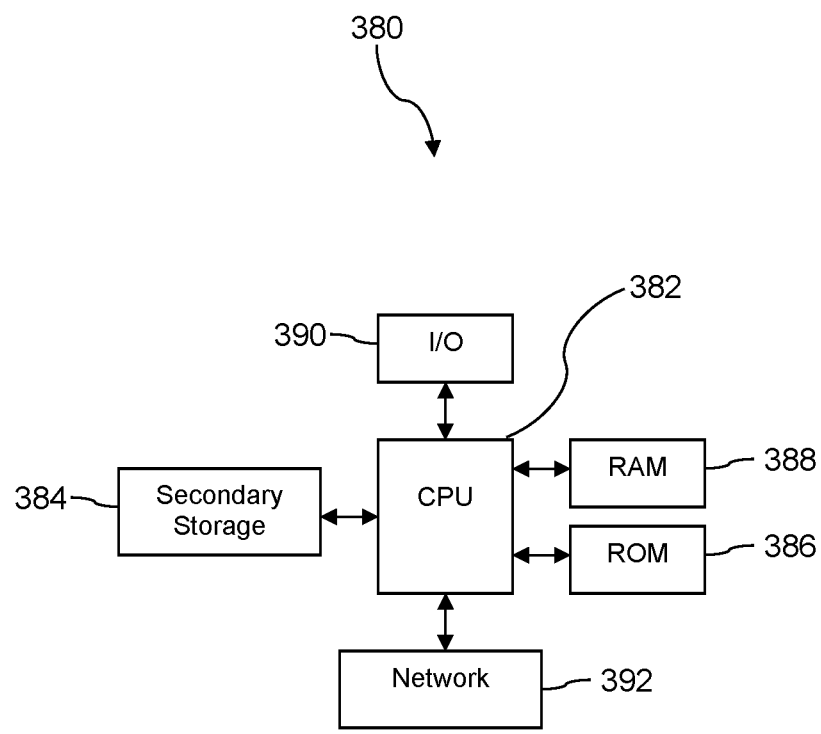
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A central routing function (CRF) platform, comprising:
   at least one processor;
   a non-transitory memory communicatively coupled to the at least one processor that stores a plurality of prioritized call route lists;
   a back-to-back user agent application stored in the non-transitory memory that, when executed by the processor, receives a request for a call route list from a network element, wherein the request comprises a destination telephone number;
   a list generation application stored in the non-transitory memory that, when executed by the processor, obtains the call route list from the prioritized call route lists stored in the non-transitory memory based on the destination telephone number, wherein the call route list comprises a plurality of addresses, and
   a pseudo domain name server (DNS) application stored in the non-transitory memory that, when executed by the processor, translates each address in the call route list into an Internet Protocol (IP) address, and
   wherein the back-to-back user agent application, when executed by the processor, attempts to terminate a call using the IP address in the call route list, and
   wherein the CRF platform is implemented in a software container.

2. The CRF platform of claim 1, further comprising a key performance indicator (KPI) collector application stored in the non-transitory memory that, when executed by the processor, records one or more KPIs based on an attempt to terminate the call using the IP address.

3. The CRF platform of claim 1, further comprising a monitoring application that, when executed by the processor, monitors a status of each international session border controller (ISBC) accessible by the CRF platform by sending heartbeat messages to each ISBC in external carrier networks according to a predefined schedule.

4. The CRF platform of claim 3, wherein the monitoring application, when executed by the processor, indicates the status of each ISBC in a data store, wherein the status indicates whether the ISBC is active and available to receive traffic.

5. The CRF platform of claim 1, wherein each of the plurality of addresses in the call route list is a fully qualified domain name (FQDN), and wherein the IP address is associated with an international session border controller (ISBC) in an external carrier network.

6. The CRF platform of claim 1, wherein the back-to-back user agent application attempts to complete the call using the IP address by transmitting a session initiation protocol (SIP) invite to the IP address.

7. The CRF platform of claim 1, wherein the back-to-back user agent application attempts to complete the call using a plurality of IP addresses in the call route list according to a prioritized order of the IP addresses in the call route list.

8. A method of implementing a central routing function (CRF) platform to provide reliable call control on a call route and ensure that a call terminates effectively, comprising:
   storing, in a non-transitory memory of the CRF platform, a plurality of prioritized call route lists, wherein each prioritized call route list associates the call route to a destination telephone number in a prioritized order;
   receiving, by a back-to-back user agent application of the CRF platform, a request for a call route list from a network element, wherein the request comprises a destination telephone number;

obtaining, by a list generation application of the CRF platform, the call route list from the prioritized call route lists based on the destination telephone number;

attempting, by the back-to-back user agent application, to complete the call using one or more IP addresses in the call route list according to the prioritized order until the call terminates effectively; and recording, by a key performance indicator (KPIs) collector application, one or more KPIs based on each attempt to complete the call using the one or more IP addresses, wherein the CRF platform is implemented in part using a software container.

9. The method of claim 8, further comprising monitoring, by a monitoring application of the CRF platform, a status of each international session border controller (ISBC) accessible by the CRF platform by sending session initiation protocol (SIP) messages to each ISBC according to a predefined schedule.

10. The method of claim 9, further comprising indicating, in the non-transitory memory, the status of each ISBC, wherein the status indicates whether the ISBC is active and available to receive traffic.

11. The method of claim 8, wherein the call route list comprises a plurality of addresses formatted as fully qualified domain names (FQDNs), and wherein the method further comprising translating, by a pseudo domain name server (DNS) application of the CRF platform, each FQDN in the call route list into the one or more IP addresses.

12. The method of claim 8, wherein the one or more IP addresses are each associated with an external carrier network, external to a home carrier network in which the CRF platform is positioned.

13. The method of claim 8, wherein attempting, by the back-to-back user agent application, to complete the call using one or more IP addresses in the call route list comprises transmitting, by the back-to-back user agent application, a session initiation protocol (SIP) invite to each of the one or more IP addresses.

14. The method of claim 8, wherein the back-to-back user agent application is implemented as a session initiation protocol (SIP) stack.

15. A method of implementing a central routing function (CRF) platform to provide reliable call control on a call route and ensure that a call terminates effectively, comprising:

storing, in a non-transitory memory accessibly by the CRF platform, a plurality of prioritized call route lists, wherein each prioritized call route list associates the call route to a destination telephone number in a prioritized order;

receiving, by a back-to-back user agent application of the CRF platform, a request for a call route list from a network element, wherein the request comprises a destination telephone number;

obtaining, by a list generation application of the CRF platform, the call route list from the prioritized call route lists based on the destination telephone number, wherein the call route list comprises a plurality of addresses;

translating, by a pseudo domain name server (DNS) application of the CRF platform, each address in the call route list into one or more IP addresses; and attempting, by the back-to-back user agent application, to complete the call using the one or more IP addresses according to the prioritized order until the call terminates effectively.

16. The method of claim 15, further comprising recording, by a key performance indicator (KPIs) collector application, one or more KPIs based on each attempt to complete the call using the one or more IP addresses.

17. The method of claim 15, wherein the CRF platform is implemented in a containerized environment.

18. The method of claim 15, further comprising monitoring, by a monitoring application of the CRF platform, a status of each international session border controller (ISBC) accessible by the CRF platform by sending session initiation protocol (SIP) messages to each ISBC according to a predefined schedule.

19. The method of claim 18, wherein the one or more IP addresses are each associated with an external carrier network, external to a home carrier network in which the CRF platform is positioned.

20. The method of claim 15, wherein the addresses in the call route list are formatted as fully qualified domain names (FQDN).

* * * * *